United States Patent [19]

McDonnell et al.

[11] Patent Number: 5,611,957

[45] Date of Patent: Mar. 18, 1997

[54] FERROELECTRIC LIQUID CRYSTAL DEVICE

[75] Inventors: Damien G. McDonnell; John C. Jones; Ian C. Sage, all of Worcestershire, United Kingdom

[73] Assignee: The Secretary of State for Defence in her Britannic Majesty's Government of the United Kingdom of Great Britain and Northern Ireland of Defence Research Agency, United Kingdom

[21] Appl. No.: 436,479

[22] PCT Filed: Nov. 22, 1993

[86] PCT No.: PCT/GB93/02422

§ 371 Date: Jul. 5, 1995

§ 102(e) Date: Jul. 5, 1995

[87] PCT Pub. No.: WO94/12591

PCT Pub. Date: Jun. 9, 1994

[30] Foreign Application Priority Data

Nov. 24, 1992 [GB] United Kingdom .................... 9224542

[51] Int. Cl.⁶ .................... C09K 19/52; G02F 1/13
[52] U.S. Cl. .................... 252/299.01; 252/299.61; 252/299.62; 252/299.63; 252/299.64; 252/299.65; 252/299.66; 252/299.67; 349/171; 349/184; 428/1
[58] Field of Search .................... 252/299.01, 299.64, 252/299.65, 299.66, 299.67, 299.61, 299.62, 299.63; 359/56, 103, 104; 428/1

[56] References Cited

U.S. PATENT DOCUMENTS 5,133,896 7/1992 Coates et al. .................... 252/299.65
5,168,383 12/1992 Iwaki et al. .................... 259/104
5,404,237 4/1995 Katsuse et al. .................... 359/56
5,523,128 6/1996 Itoh et al. .................... 359/75
5,529,717 6/1996 Murashiro et al. .................... 252/299.61

OTHER PUBLICATIONS

Surguy et al, Ferroelectrics, 1991, vol. 122, pp. 63–79, The "Joers/Alvey" Ferroelectric Multiplexing Scheme.

Towler et al, Liquid Crystals, 1992, vol. 11, No. 3, 365–371 "The effect of the biaxial permittivity tensor and tilted layer geometries on the switching of ferroelectric liquid crystals".

Primary Examiner—Shean C. Wu
Attorney, Agent, or Firm—Nixon & Vanderhye

[57] ABSTRACT

Multiplex addressed ferroelectric liquid crystal devices containing liquid crystal mixtures composed of components A, B and C. Component A consists of one or more optically active compounds capable of imparting a spontaneous polarization to the material. Component B is a compound or compounds of the formula:

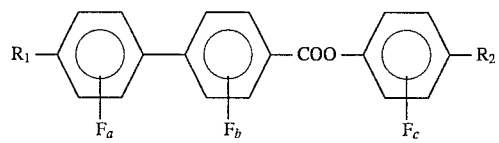

where $R_1$ and $R_2$ independently represent straight or branched chain $C_3$–$C_{12}$ alkyl or alkoxy groups, a, b and c are independently 0, 1 or 2 and the total of a+b+c is not greater than 4. Component C is selected from a range of liquid crystal components.

14 Claims, 3 Drawing Sheets

▲ 0 VAC (30°C)
+ 5 VAC (30°C)
□ 7·5 VAC (30°C)

FERROELECTRIC LIQUID CRYSTAL DEVICE

This application is a 371 of PCT/9B93/02422 filed Nov. 23, 1993. This invention relates to ferroelectric liquid crystal devices and ferroelectric liquid crystal mixtures.

BACKGROUND OF THE INVENTION

Liquid crystal devices commonly comprise a thin layer of a liquid crystal material contained between two glass slides. Optically transparent electrodes are formed on the inner surface of both slides. When an electric voltage is applied to these electrodes the resulting electric field changes the molecular alignment of the liquid crystal molecules. The changes in molecular alignment are readily observable and form the basis for many types of liquid crystal device.

In ferroelectric liquid crystal devices the molecules switch between different alignment directions depending on the polarity of an applied electric field. These devices often exhibit bistability where the molecules tend to remain in one of two states until switched to the other switched state. This allows the multiplex addressing of quite large and complex devices.

One common multiplex display has display elements, ie pixels, arranged in an x, y matrix format for the display of eg, alpha numeric characters. The matrix format is provided by forming the electrodes on one slide as a series of column electrodes, and the electrodes on the other slide as a series of row electrodes. The intersections between each column and row form addressable elements or pixels. Other matrix layouts are known, eg seven bar numeric displays.

There are many different multiplex addressing schemes. A common feature involves the application of a voltage, called a strobe voltage to each row or line in sequence. Coincidentally with the strobe applied at each row, appropriate voltages, called data voltages, are applied to all column electrodes. The differences between the different schemes lies in the shape of the strobe and data voltage waveforms.

Other addressing schemes are described in GB-2,146,473-A; GB-2,173,336-A; GB-2,173,337-A: GB-2,173,629-A; WO 89/05025; Harada et al 1985 S.I.D. Paper 8.4 pp 131–134; Lagerwall et al 1985 I.D.R.C pp 213–221 and P Maltese et al in Proc 1988 IDRC p 90–101 Fast Addressing for Ferro Electric LC Display Panels.

The material may be switched between its two states by two strobe pulses of opposite sign, in conjunction with a data waveform. Alternatively, a blanking pulse may be used to switch the material into one of its states. Periodically the sign of the blanking and the strobe pulses may be alternated to maintain a net d.c. value.

These blanking pulses are normally greater in amplitude and length of application than the strobe pulses so that the material switches irrespective of which of the two data waveforms is applied to any one intersection. Blanking pulses may be applied on a line by the basis ahead of the strobe, or the whole display may be blanked at one time, or a group of lines may be simultaneously blanked.

It is well known in the field of ferroelectric liquid crystal device technology that in order to achieve the highest performance from devices, it is important to use mixtures of compounds which give materials possessing the most suitable ferroelectric smectic characteristics for particular types of device.

Devices can be assessed for speed by consideration of the response time vs pulse voltage curve. This relationship may show a minimum in the switching time ($t_{min}$) at a particular applied voltage ($V_{min}$). At voltages higher or lower than $V_{min}$ the switching time is longer than $t_{min}$. It is well understood that devices having such a minimum in their response time vs voltage curve can be multiplex driven at high duty ratio with higher contrast than other ferroelectric liquid crystal devices. It is preferred that the said minimum in the response time vs voltage curve should occur at low applied voltage and at short pulse length respectively to allow the device to be driven using a low voltage source and fast frame address refresh rate.

Typical known materials (where materials are a mixture of compounds having suitable liquid crystal characteristics) which do not allow such a minimum when included in a ferroelectric device include the commercially available materials known as SCE13 and ZLI-3654 (both supplied by Merck UK Ltd, Poole, Dorset). A device which does show such a minimum may be constructed according to PCT GB 88/01004 and utilising materials such as eg commercially available SCE8 (Merck UK Ltd.). Other examples of prior art materials are exemplified by PCT/GB/86/00040, PCT/GB87/00441 and UK 2232416B.

It is the aim of this invention to provide devices having a shorter switching time and/or a lower voltage than previously achieved.

DESCRIPTION OF THE INVENTION

According to this invention a ferroelectric liquid crystal device (eg multiplex addressed) comprises two spaced cell walls each bearing electrode structures and treated on at least one facing surface with an alignment layer, a layer of a smectic liquid crystal material enclosed between the cell walls, a minimum in its response time versus voltage curve, characterised in that the liquid crystal material consists of three components; A, B and C, where the three components are given by:

Component A being present in the range of 0.1–50 wt % and is one or more optically active compounds capable of imparting a spontaneous polarisation to the material.

Component B being present in the range of 10–90 wt % and selected as one or more compounds having formula B:

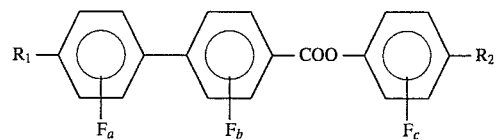

$R_1$ and $R_2$ independently represent straight or branched chain $C_3$–$C_{12}$ alkyl or alkoxy; a, b and c are independently 0, 1 or 2 and the total of a+b+c is not greater than 4.

Component C is present in the range sufficient to enable A+B+C=100 wt %, and is one or more compounds selected from:

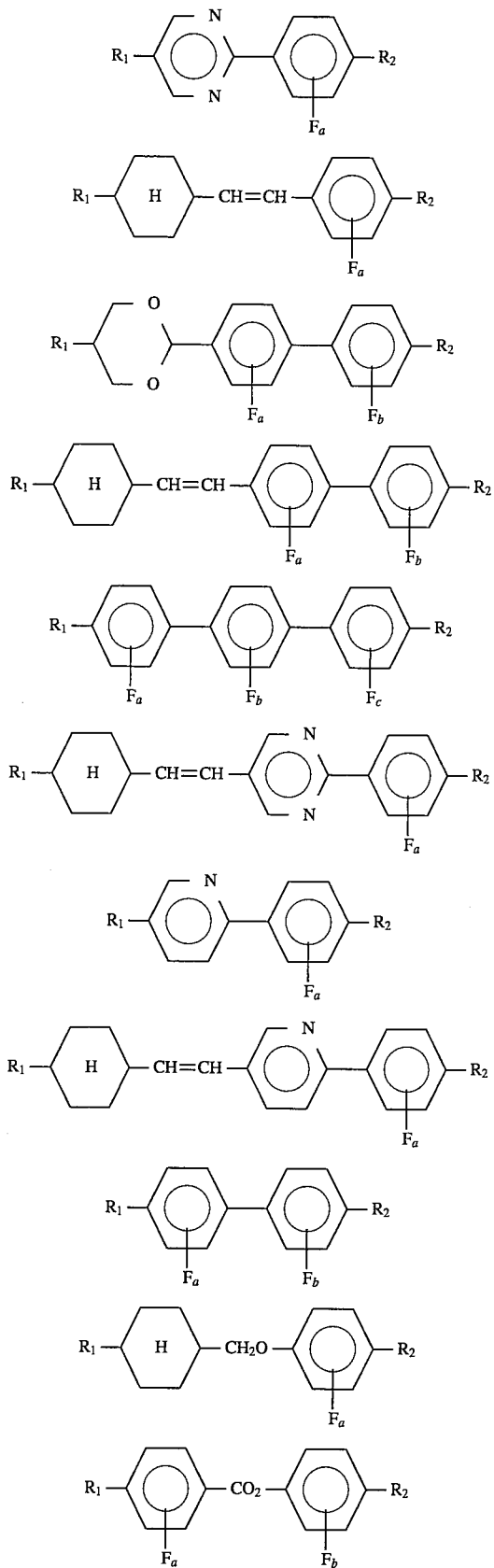

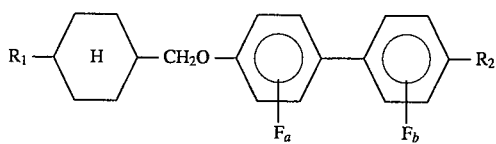

wherein a, b and c are independently 0, 1, 2, 3; $R_1$ and $R_2$ are $C_{1-15}$ alkyl or alkoxy, preferably $C_4$–$C_{12}$.

Preferably Component A is present in the range 1–15 wt %, even more preferably 1–5 wt %. Preferably Component B is present in the range 30–60 wt %.

Preferably the material contains one or more compounds of the formulae:

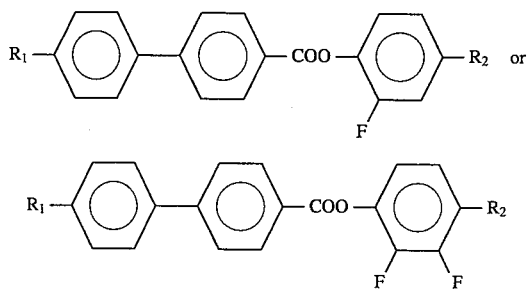

Preferably the material contains optically active dopants of the formula below as described in PCT/GB88/01111;

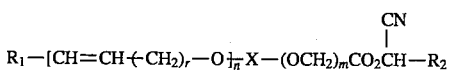

including wherein $R_1$ is selected from hydrogen, $C_{1-12}$ alkyl, alkoxy, perfluoroalkyl and perfluoroalkoxy and may be straight chain or branched chain; $R_2$ is alkyl, which may be $C_{1-8}$ straight chain, $C_{3-15}$ branched chain or cyclic, r is an integer 1–10, n and m are independently 0 or 1; X is a group of general formula:

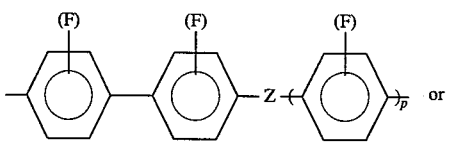

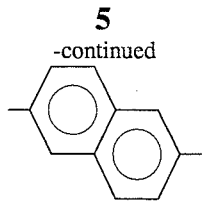

where (F) indicates that the relevant phenyl ring may carry 1 or 2 fluorine substituents, p is 0 or 1, Z is a single bond when p is O and COO or a single bond when p is 1.

The CN group may be substituted by $CH_3$, $CF_3$, halogen, preferably F or Cl. The $CO_2$ group may be reversed. The chiral unit $CH(CN)R_2$ may be replaced by a chiral epoxide group. One or more of the phenyl groups may be replaced by a cyclohexyl group.

Preferably the device has a $V_{min}$ less than 45 volts and/or a $t_{min\ less}$ than 100 µs.

Figure 1:
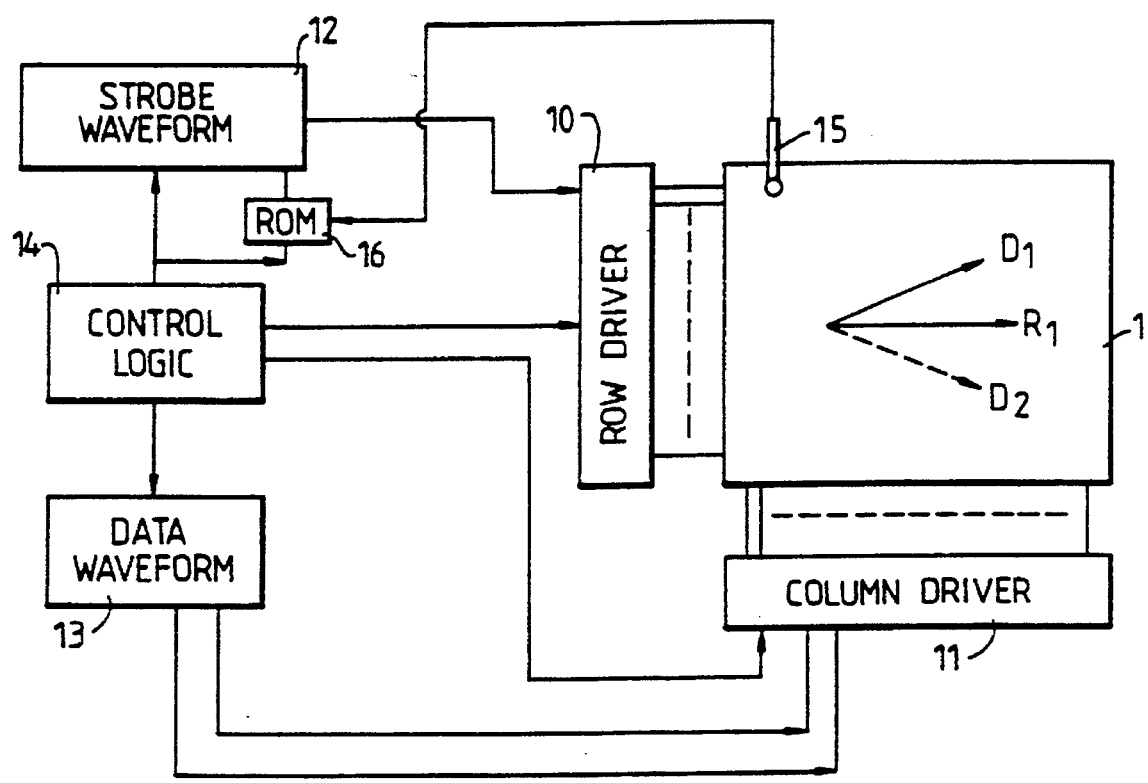
FIG. 1 is a diagrammatic view if a time multiplex addressed x,y matrix.
Figure 2:
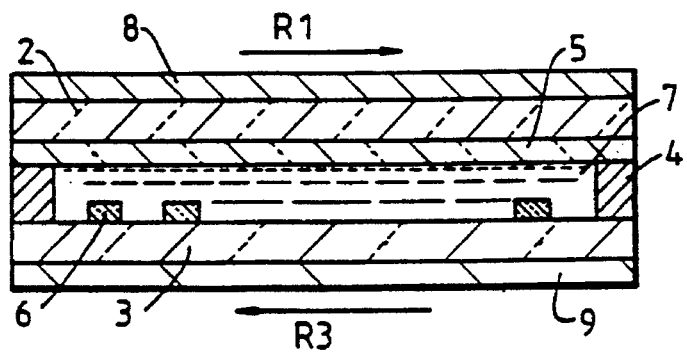
FIG. 2 is an enlarged cross-sectional view of the display of FIG. 1.
Figure 3:
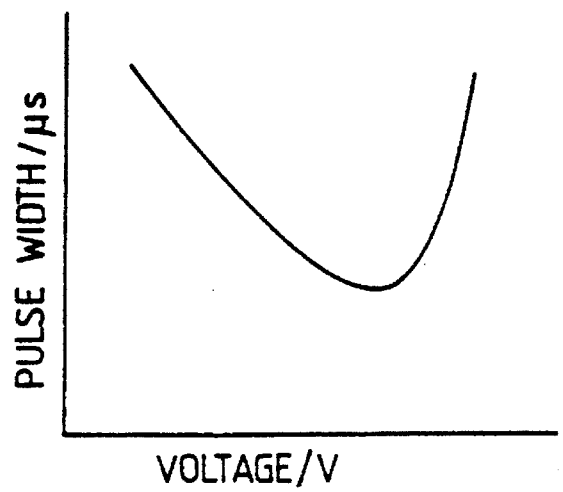
FIG. 3 is a graph representing turnaround.

The invention will now be described by way of example only with reference to the accompanying drawings of which:

FIG. 1 is a diagrammatic view of a time multiplex addressed x, y matrix;

FIG. 2 is a cross section of part of the display of FIG. 1 to an enlarged scale;

FIG. 3 is a representation of a turnaround in a ($t_{min}/V_{min}$) feature.

Figure 4:
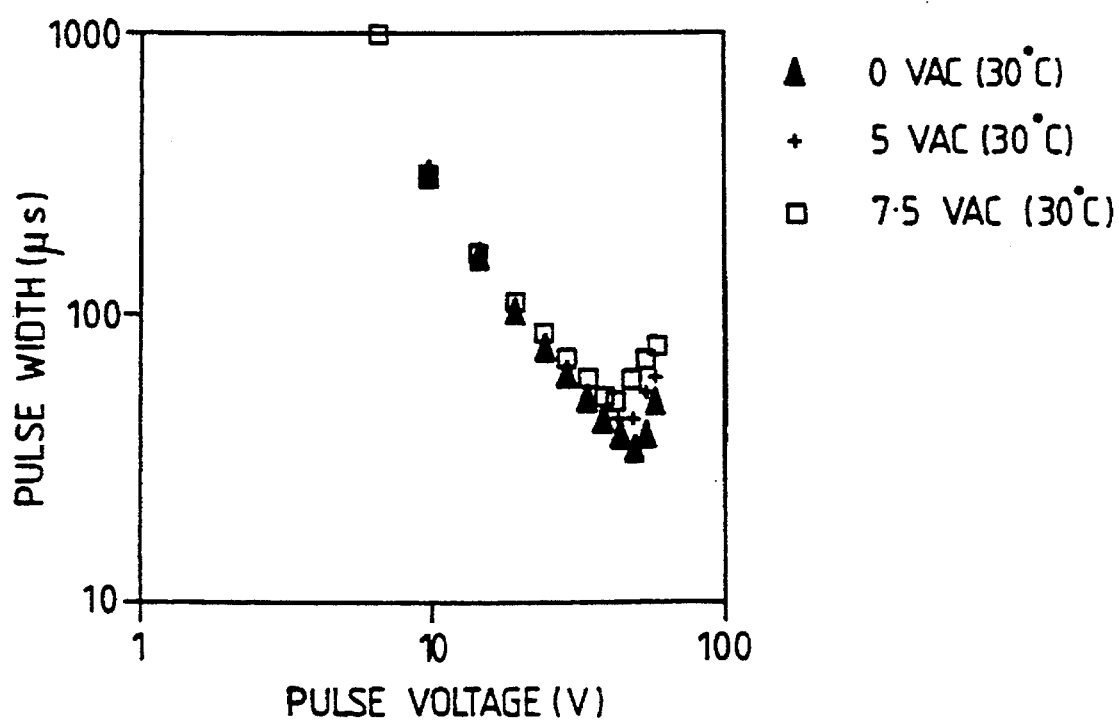
FIG. 4 is a graph of turnaround for mixture 1 of Table 1.
Figure 5:
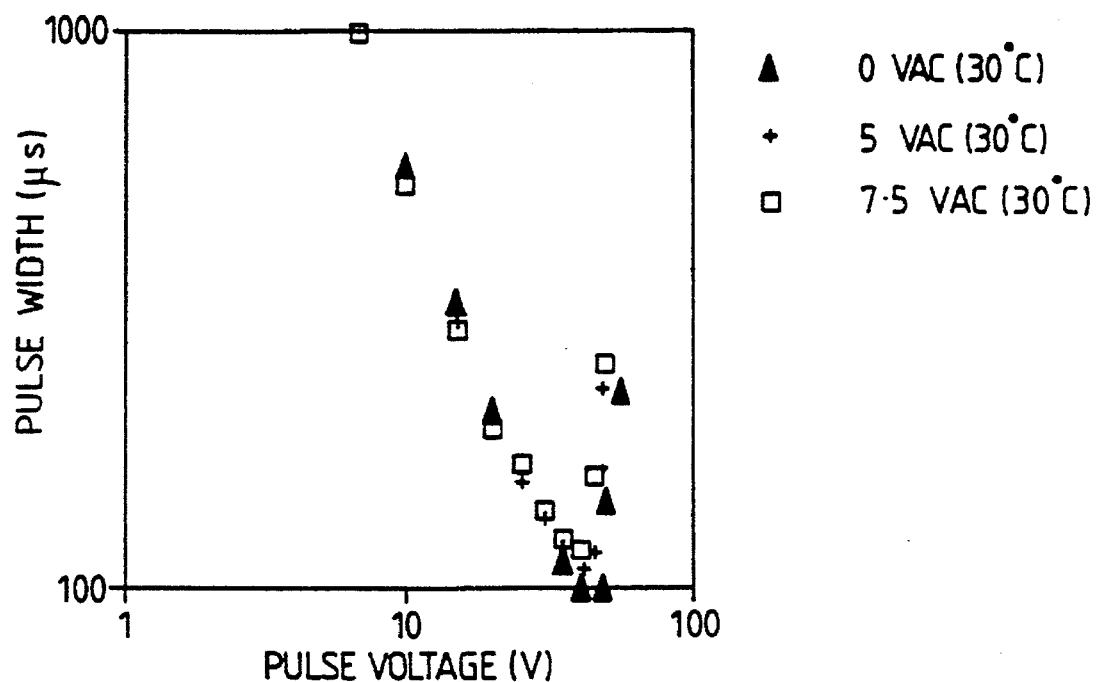
FIG. 5 is a graph of turnaround for mixture 1 of Table 2.
Figure 6:
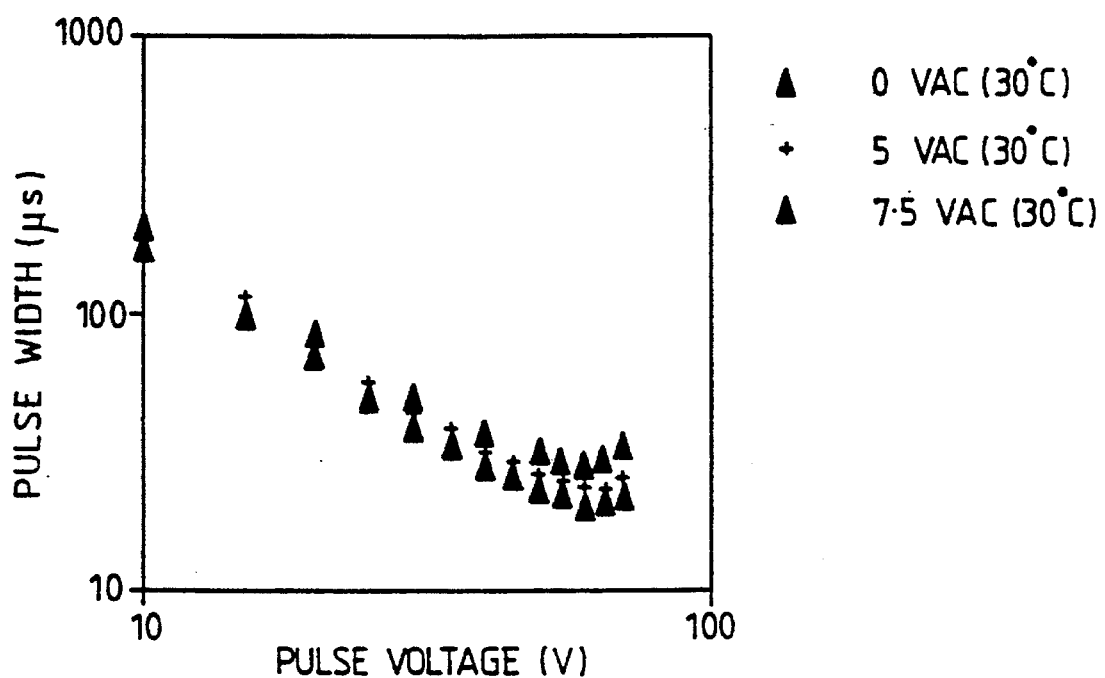
FIG. 6 is a graph of turnaround for mixture 1 of Table 3.

FIGS. 4–6 are graphs of $t_{min}$ versus $V_{min}$ at 30° C. for mixtures 1.2 and 3 respectively, (see Table 1 for mixtures).

The display 1 shown in FIGS. 1, 2 comprises two glass walls 2, 3 spaced about 1–6 µm apart by a spacer ring 4 and/or distributed spacers.

Electrode structures 5, 6 of transparent tin oxide are formed on the inner face of both walls. These electrodes are shown as rows and columns forming an X, Y matrix but may be of other forms. For example, of segments formed into a digital seven bar display.

A layer 7 of liquid crystal material is contained between the walls 2, 3 and spacer ring 4.

Polarisers 8, 9 are arranged in front of and behind the cell 1. Row 10 and column 11 drivers apply voltage signals to the cell. Two sets of waveforms are generated for supplying the row and column drivers 10, 11. A strobe wave form generator 12 supplies row waveforms, and a data waveform generator 13 supplies ON and OFF waveforms to the column drivers 11. Overall control of timing and display format is controlled by a contrast logic unit 14.

Prior to assembly the walls 2, 3 are surface treated for example by spinning on a thin layer of polyamide or polyamide, drying and where appropriate curing; then buffing with a soft clean cloth (eg rayon) in a single direction R1, R2. This known treatment provides a surface alignment for liquid crystal molecules. In the absence of an applied electric field the molecules align themselves along the rubbing direction; R1 and R2 are parallel (+/−30°) in the same or opposite directions. When suitable unidirectional voltages are applied the molecular director aligns along one of two directors D1, D2 which are at an angle of about 45° to each other.

The device includes means of discriminating the states optically, eg 1 or more polarisers. It may operate in a transmissive or reflective mode. In the former light passing through the device eg from a tungsten bulb is selectively transmitted or blocked to form the desired display. In the reflective mode a mirror is placed behind the second polariser 9 to reflect ambient light back through the cell 1 and two polarisers. By making the mirror partly reflecting the device may be operated both in a transmissive and reflective mode.

Pleochroic dyes may be added to the material 7. In this case, only one polariser is needed and the layer thickness may be 4–10 µm.

For a typical thickness of 2 µm the material at 22° C. is switched by adc pulse of + or −50 volts for 100 µs. The two switched states D1, D2 may be arbitrarily defined as ON after receiving a positive pulse and OFF after receiving a negative pulse of sufficient magnitude. Polarisers 8, 9 are arranged with their polarisation axes perpendicular to one another and with one of the axes parallel to the director in one of the switched states.

In operation, strobe waveforms are applied to each row in turn whilst appropriate ON or OFF data waveforms are applied to each column electrode. This provides a desired display pattern formed by some x, y intersection in an ON state and another in an OFF state. Such addressing is termed multiplex addressing.

DESCRIPTION OF THE PREFERRED EMBODIMENTS

The following compounds and mixtures are examples illustrative of the invention.

|   |   | R | R' | % |
|---|---|---|---|---|
| A | $C_8H_{17}O$—⬡—⬡—$CO_2C.H(CN)CH(CH_3)_2$ | | | |
| B | R—⬡—⬡—$CO_2$—⬡(F)—R' | $C_8H_{17}$<br>$C_8H_{17}O$<br>$C_7H_{15}O$ | $C_5H_{11}$<br>$C_5H_{11}$<br>$C_7H_{15}$ | 33.3<br>33.3<br>33.3 |
| $C_1$ | RO—⬡(N,N)—⬡—R' | $C_7H_{15}$<br>$C_9H_{19}$ | $C_9H_{19}$<br>$C_9H_{19}$ | 33.3<br>66.6 |

-continued

| | | | R | R' | % |
|---|---|---|---|---|---|
| $C_2$ | RO—⌬—⌬(F)—⌬—R' | | $C_6H_{13}$ | $C_5H_{11}$ | 22.0 |
| | | | $C_4H_9$ | $C_5H_{11}$ | 32.5 |
| | | | $C_8H_{17}$ | $C_5H_{11}$ | 29.5 |
| | | | $C_{10}H_{21}$ | $C_5H_{11}$ | 16.0 |
| $C_3$ | $C_8H_{17}O$—⌬—$CO_2$—⌬(F)—$C_5H_{11}$ | | | | |

TABLE 1

Mixtures containing component B

| | Mixtures | | |
|---|---|---|---|
| | 1<br>1% A in<br>B/$C_1$:1/1 | 2<br>1% A in<br>B:40%<br>$C_2$:40%<br>$C_3$:20% | 3<br>2.5% A in<br>B:77.5%<br>$C_3$:20% |
| $T_{A-C}/°C.$ | 66.5 | 65.5 | 77.5 |
| θ/° at 30° C. | 17 | 17 | 21 |
| Ps/x$10^{-5}$ Cm$^{-2}$ at 30° C. | 3.2 | 2.2 | 9.9 |
| $E_{min}/Ps$<br>$OV_{ac}$ | $V_{min} = 50$ V<br>$6.8 \times 10^{11}$ | $V_{min} = 42.5$ V<br>$10.2 \times 10^{11}$ | $V_{min} = 62.5$ V<br>$3.8 \times 10^{11}$ |
| $t_{min} \times Ps^2$<br>$OV_{ac}$ | $t_{min} = 36$ μs<br>$3.7 \times 10^{-14}$ | $t_{min} = 100$ μs<br>$4.8 \times 10^{-14}$ | $t_{min} = 21$ μs<br>$20.6 \times 10^{-14}$ |
| $E_{min}/Ps$<br>7.5 $V_{ac}$ | $V_{min} = 45$ V<br>$6.1 \times 10^{11}$ | $V_{min} = 40$ V<br>$9.6 \times 10^{11}$ | $V_{min} = 67.5$ V<br>$4.1 \times 10^{11}$ |
| $t_{min} \times Ps^2$<br>7.5 $V_{ac}$ | $t_{min} = 50$ μs<br>$5.1 \times 10^{-14}$ | $t_{min} = 117$ μs<br>$5.7 \times 10^{-14}$ | $t_{min} = 29$ μs<br>$28.4 \times 10^{-14}$ |

$T_{A-C}$ = Smectic A–Smectic C phase transition temperature.
θ = Cone Angle.
Ps = Spontaneous Polarisation.
E = Electric field.
cell thickness (d/μm) for the three different mixtures 1.2 and 3 is 2.3, 1.9 and 1.65 respectively.

TABLE 2

Mixtures containing no component B.

| | Mixtures | | |
|---|---|---|---|
| | 4<br>1% A in<br>$C_1/C_2$:1/1 | 5<br>2% A in<br>($C_2$ + 10% $C_3$) | 6<br>2% A in<br>($C_1$ + 10% $C_3$) |
| $T_{A-C}/°C.$ | 65.5 | 85.3 | 39.3 |
| θ/° at 30° C. | 16.8 | 11.0<br>(18 at 50° C.) | 14.5 |
| Ps/x$10^{-5}$ Cm$^{-2}$ at 30° C. | 1.82 | 4.3<br>(3.6 at 50° C.) | 2.8 |
| $E_{min}/Ps$<br>$OV_{ac}$ | * | * | * |
| $t_{min} \times Ps^2$<br>$OV_{ac}$ | * | * | * |
| $E_{min}/Ps$<br>10 $V_{ac}$ | * | $V_{min} = 80$ V<br>(at 50° C.)¶<br>$11.6 \times 10^{11}$ | * |
| $t_{min} \times Ps^2$<br>10$V_{ac}$ | * | $t_{min} \times 4$ μs<br>(at 50° C.)¶<br>$7.4 \times 10^{-15}$ | * |

*Does not show a minimum in V-t measurement.
¶Minimum only measured.
Cell thickness is 1.6 μm.

When analysing the data presented in Tables 1 and 2 it is perhaps most instructive to consider the column headed $E_{min}/Ps$ and $t_{min} \times Ps^2$.

It appears from Tables 1 and 2 that the introduction of a compound described by component B results in a lower $V_{min}$. Most of the mixtures which did not contain a material described by component B did not possess a $V_{min}$. It also appears from Table 1 that the choice of compound described by component C has an effect on the response time. For example the introduction of $C_1$ results in an improvement in the response time, compare mixtures 1 and 3 in Table 1 taking Ps into account.

Tables 3–7 list Ps and θ data at different temperatures for Mixtures 1,2,4,5,6.

TABLE 3

Mixture 1

| Temp/°C. | Ps/nCcm$^{-2}$ | Cone Angle/° |
|---|---|---|
| 65 | | 1.3 |
| 60 | 1.39 | 9.0 |
| 50 | 2.13 | 13.0 |
| 40 | 2.66 | 15.0 |
| 30 | 3.15 | 16.5 |
| 20 | 3.60 | |

TABLE 4

Mixture 2

| Temp/°C. | Ps/nCcm$^{-2}$ | Cone Angle/° |
|---|---|---|
| 65 | 0.10 | 2.3 |
| 60 | 0.83 | 9.8 |
| 50 | 1.46 | 13.1 |
| 40 | 1.93 | 14.9 |
| 30 | 2.16 | 17.3 |
| 20 | 2.26 | 18.1 |

TABLE 5

Mixture 4

| Temp/°C. | Ps/nCcm$^{-2}$ | Cone Angle/° |
|---|---|---|
| 65 | 0.12 | 0.9 |
| 60 | 0.86 | 9.4 |
| 50 | 1.32 | 13.7 |
| 40 | 1.65 | 15.8 |
| 30 | 1.82 | 16.8 |
| 20 | 1.90 | 17.2 |

TABLE 6

| | Mixture 5 | |
|---|---|---|
| Temp/°C. | Ps/nCcm$^{-2}$ | Cone Angle/° |
| 80 | 1.4 | 8.0 |
| 75 | 2.0 | 15.0 |
| 70 | 2.5 | 17.0 |
| 60 | 3.0 | 19.0 |
| 50 | 3.6 | 17.5 |
| 40 | 4.0 | 13.5 |
| 30 | 4.3 | 11.0 |
| 25 | 3.8 | |
| 20 | | |
| 55 | | 19.0 |
| 45 | | 17.0 |

TABLE 7

| | Mixture 6 | |
|---|---|---|
| Temp/°C. | Ps/nCcm$^{-2}$ | Cone Angle/° |
| 40 | | 4.3 |
| 35 | 2.2 | 10.5 |
| 30 | 2.8 | 14.5 |
| 25 | 3.4 | |
| 20 | 3.8 | 14.5 |
| 15 | 4.2 | |
| 10 | 4.5 | 17.0 |
| 5 | | |
| 0 | | |
| 38 | | 8.2 |

We claim:

1. A retroelectric liquid crystal device comprising two spaced cell walls each bearing electrode structures and treated on at least one facing surface with an alignment layer, a layer of a smectic liquid crystal material enclosed between the cell walls, a minimum in its response time versus voltage curve, wherein the liquid crystal material consists of three components; A, B and C, where the three components are given by:

Component A being present in the range of 0.1–50 wt % and is one or more optically active compounds capable of imparting a spontaneous polarisation to the material;

Component B being present in the range of 10–90 wt % and selected as one or more compounds having formula B:

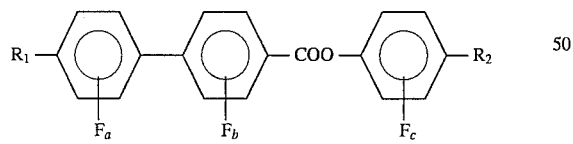

$R_1$ and $R_2$ independently represent straight or branched chain $C_3$–$C_{12}$ alkyl or alkoxy; a, b and c are independently 0.1 or 2 and the total of a+b+c is not greater than 4;

Component C is present in the range sufficient to enable A+B+C=100 wt %, and is one or more compounds selected from:

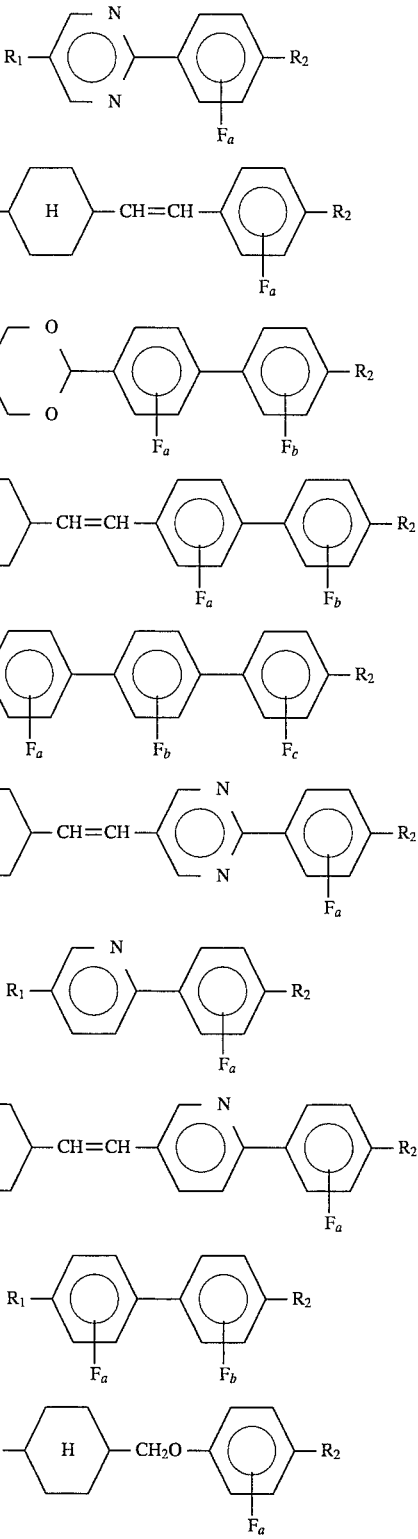

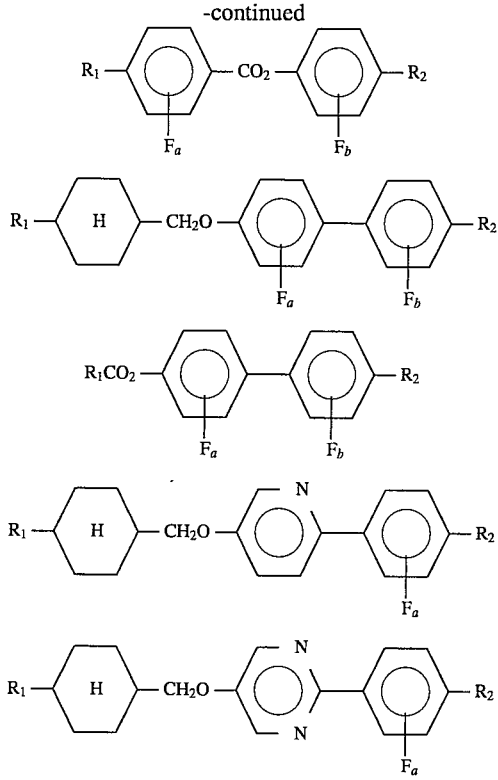

wherein a, b and c are independently 0, 1, 2, 3; $R_1$ and $R_2$ are $C_1$–$C_{15}$ alkyl or alkoxy.

2. A device according to claim 1 wherein component C is is one or more compounds selected from:

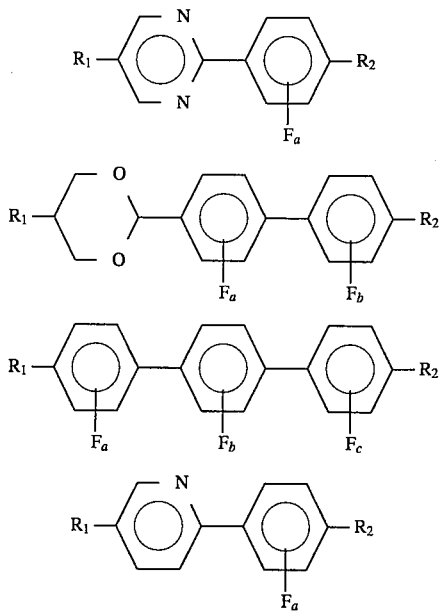

3. A device according to claim 1 wherein component A is given by the following general formula:

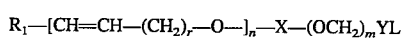

wherein $R_1$ is selected from hydrogen, $C_{1-12}$ alkyl, alkoxy, perfluoroalkyl and perfluoroalkoxy and may be straight chain or branched chain; r is an integer 1–10, n and m are independently 0 or 1; X is a group of general formula:

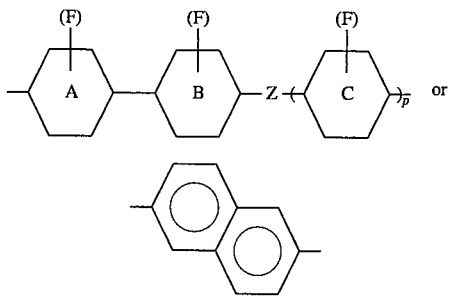

A, B and C may be independently phenyl or cyclohexyl; (F) indicates that the relevant ring may carry 1 or 2 fluorine substituents; p is 0 or 1; Z is a single bond when p is 0, and COO or a single bond when p is 1; Y may be $CO_2$ or $O_2C$; L may be a chiral epoxide or is given by the formula:

J may be CN, F, Cl, $CH_3$, or $CF_3$; $R_2$ is alkyl, which may be $C_{1-8}$ straight chain, $C_{3-15}$ branched chain or cyclic.

4. A device according to claim 1 wherein component A is given by the following general formula:

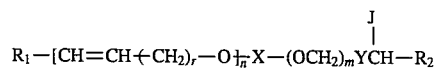

wherein $R_1$ is selected from hydrogen, $C_{1-12}$ alkyl, alkoxy, perfluoroalkyl and perfluoroalkoxy and may be straight chain or branched chain; $R_2$ is alkyl, which may be $C_{1-8}$ straight chain, $C_{3-15}$ branched chain or cyclic, r is an integer 1–10, n and m are independently 0 or 1; Y may be $CO_2$ or $O_2C$; J may be CN, F, Cl, $CH_3$ or $CF_3$; X is a group of general formula:

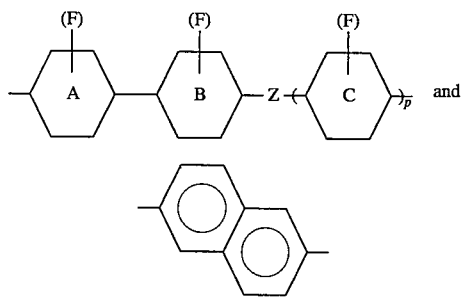

A, B and C may be independently phenyl or cyclohexyl (F) indicates that the relevant fine may carry 1 or 2 fluorine substituents; p is 0 or 1; Z is a single bond when p is 0, and COO or a single bond when p is 1.

5. A device according to claim 4 wherein J is CN and Y is $CO_2$.

6. A device according to claim 5 wherein A, B and C are phenyl rings.

7. A device according to claim 6 wherein component A is given by the following general formula:

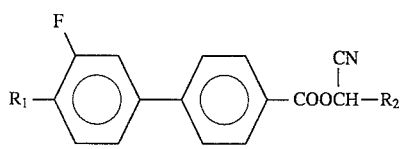

8. A device according to claim 6 wherein component A is given by one of the following general formulae:

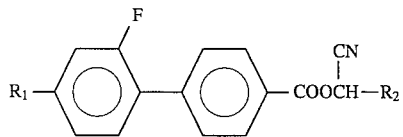

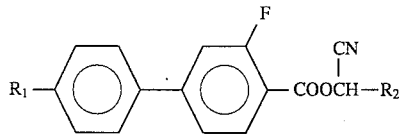

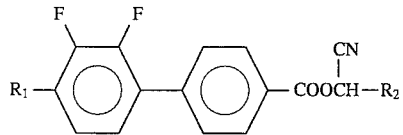

9. A device according to claim 6 wherein component A is given by the following general formula:

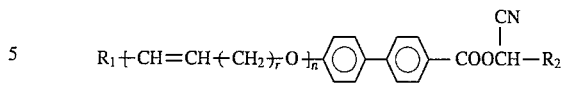

where n is 0 or 1; r is 1–6; $R_1$ is $C_{1-12}$ alkyl or alkoxy and $R_2$ is a branched chain alkyl.

10. A device according to claim 9 wherein $R_2$ is isopropyl.

11. A device according to claim 1 wherein component B is of the following formula:

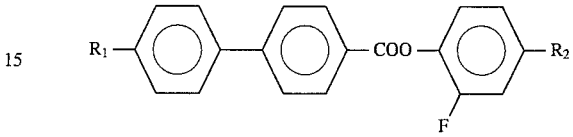

12. A device according to claim 1 wherein component B is of the following formula:

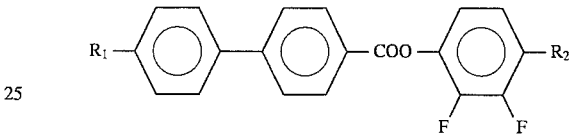

13. A device according to claim 1 wherein component A is present in the range 1–15 wt %.

14. A device according to claim 1 wherein the ferroelectric liquid crystal device is multiplex addressed.

* * * * *

UNITED STATES PATENT AND TRADEMARK OFFICE
CERTIFICATE OF CORRECTION

PATENT NO. : 5,611,957
DATED : March 18, 1997
INVENTOR(S) : McDONNELL et al

It is certified that error appears in the above-identified patent and that said letters patent is hereby corrected as shown below:

Claim 1, line 1, delete "retroelectric" insert --ferroelectric--..

Signed and Sealed this

Ninth Day of September, 1997

*Attest:*

BRUCE LEHMAN

*Attesting Officer*   Commissioner of Patents and Trademarks